United States Patent [19]

Yananton

[11] Patent Number: 4,852,518
[45] Date of Patent: Aug. 1, 1989

[54] ODORLESS ANIMAL LITTER UNIT

[76] Inventor: Patrick Yananton, 1518 Little Hill Rd., Point Pleasant, N.J. 08742

[21] Appl. No.: 20,719

[22] Filed: Mar. 2, 1987

Related U.S. Application Data

[63] Continuation-in-part of Ser. No. 10,309, Feb. 3, 1987, which is a continuation of Ser. No. 573,958, Jan. 26, 1984, Pat. No. 4,640,225, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.$^4$ .............................................. A01K 29/00
[52] U.S. Cl. ......................................................... 119/1
[58] Field of Search ............................................. 119/1

[56] References Cited

U.S. PATENT DOCUMENTS

| | | | |
|---|---|---|---|
| 3,752,121 | 8/1973 | Brazzell | 119/1 |
| 3,965,863 | 6/1976 | Scott | 119/1 |
| 4,640,225 | 2/1987 | Yananton | 119/1 |

Primary Examiner—Robert P. Swiatek
Attorney, Agent, or Firm—Sheldon H. Parker

[57] ABSTRACT

The formation of the odor associated with cat litter boxes is prevented by inhibiting the bacterial action on cat urine. A sorbent pad structure is positioned between a protective screening, capable of withstanding the clawing action of a cat, and a moisture impermeable liner. The cat urine is transferred directly from overlying litter particles, through a cat claw resistant screen into a sorbtive-desiccant member of fibers and having high surface area and high urine sorbency. The urine disperses quickly from fiber to fiber in the sorbtive-desiccant member. The moisture impermeable sheet prevents urine from leaving the side of the sorbtive-desiccant member opposite the screen. The screen and the fibers of the sorbtive-desiccant member provide for aeration, thus inhibiting the growth and bacterial action of bacteria as well as the evaporation of the urine from the sorbtive-desiccant member. Consequently, the bacteria die or become dormant thereby preventing significant odor formation.

26 Claims, 1 Drawing Sheet

ODORLESS ANIMAL LITTER UNIT

CROSS REFERENCE TO RELATED APPLICATION

This application is a continuation-in-part of the pending patent application Ser. No. 10,309, filed Feb. 3, 1987, which application is a continuation of U.S. Pat. No. 4,640,225, which is a continuation-in-part of U.S. Pat. No. 4,469,046 issued Sept. 4, 1984 and which was a continuation-in-part of application Ser. No. 909,256, filed May 24, 1978, now abandoned, the subject matter and description of which is incorporated herein by reference thereto, as though set forth herein in detail.

BACKGROUND OF THE INVENTION

1. Field of the Invention

This invention relates to improvements in a unique method for odor prevention in animal litter units and to a disposable, sorbent pad-liner for use in carrying out the method in an animal litter unit, and more particularly to the odor prevention through aeration and evaporation of urine using the combination of protective screening and an sorbent/dessicant padding with a plastic liner.

2. Brief Description of the Prior Art

Many domestic animals frequently use litter boxes for the elimination of body wastes. The boxes are usually filled with various kinds of absorbent granular materials such as sand, cat litter and the like, and must be periodically emptied and cleaned, which are somewhat objectionable tasks, since the absorbent-granular material must be replaced and the boxes cleaned each time.

Cats, being the most frequent users of litter boxes, present a further problem in that the urine of the feline contains the highest content of urea which, when allowed to stand for any length of time in any sorbent material, releases an ammonia odor. This odor is one of the more objectionable factors in the ownership of a cat.

In order to eliminate the odor caused by cat urine, the litter box must be changed frequently, necessitating the expensive, laborious and unpleasant chore.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbent paper and/or a pad of absorbent fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbent layers is to hold the urine, encasing it between a bottom "impervious layer" and a top "nonabsorbent or impervious layer" of artificial grass. The trapment of the urine allows for bacteria to grow, causing odor. This bacteria growth prevents use of the pad for long periods of time.

While many patents disclose variations of animal waste handling systems they fail to provide the answer to overcoming the problem of odor, while providing an easy, economical and convenient disposal and replacement system.

SUMMARY OF THE INVENTION

In the instant invention the foregoing problems are overcome and an easy to use, odorless, disposable sorbent pad system is provided. It has now been found that the efficacy of the disposable sorbent system can be optimized if the pad characteristics are such that moisture or urine retention is minimized and evaporation is maximized. The sorbent pad structure includes a protective screening and a moisture impermeable liner. The protective screening is capable of withstanding the clawing action of an animal such as a cat, thus protecting the sorbent pad and the moisture impermeable liner. The holes in the screen are sized small enough to prevent the animal's claws from reaching the sorbent pad, while numerous and large enough to allow for air passage and rapid evaporation of liquids. The sorbent pad, constructed from high wicking capability materials, is positioned between the screen and the moisture impermeable material. The formation of the odor associated with cat litter boxes is prevented by inhibiting the bacterial action on cat urine. The cat urine is transferred directly from overlying litter particles, through the cat claw resistant screen into a sorbtive-desiccant member of fibers and having high surface area and high urine sorbency. The urine disperses quickly from fiber to fiber in the sorbtive-desiccant member. The moisture impermeable sheet prevents urine from leaving the side of the sorbtive-desiccant member opposite the screen. The screen and the fibers of the sorbtive-desiccant member provide for aeration, thus inhibiting the growth and bacterial action of bacteria as well as the evaporation of the urine from the sorbtive-desiccant member. Consequently, the bacteria die or become dormant thereby preventing significant odor formation.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
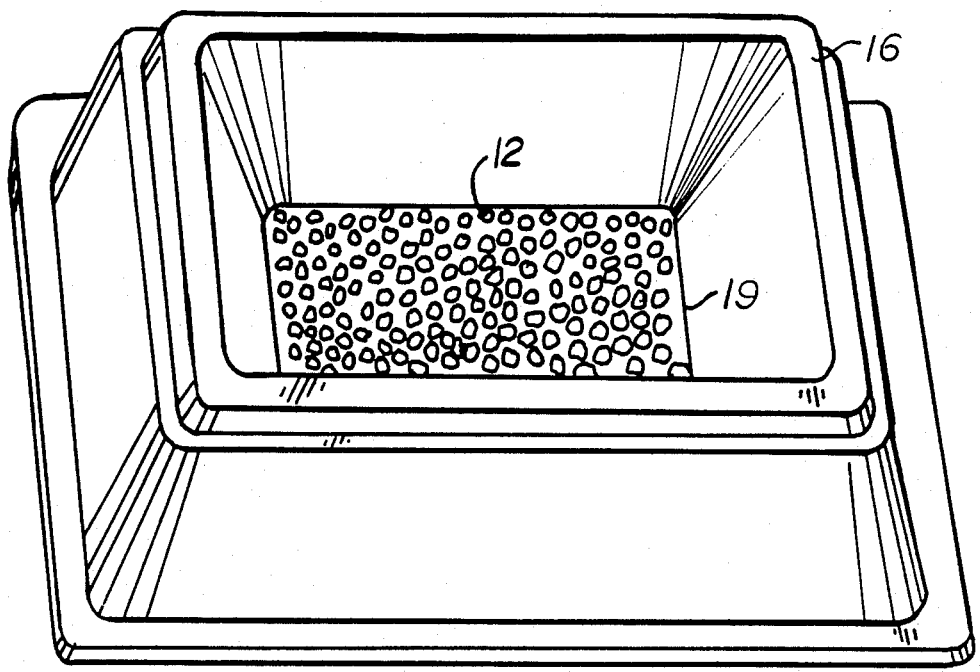
FIG. 1 is a top perspective of the assembled unit in accordance with the present invention.

In order to provide a clear understanding of the instant invention, the various aspects of the invention are hereinafter described in detail and background information provided.

The sorbent pad structure of the instant invention includes a protective screening and a moisture impermeable liner. The screen is a flexible member formed of strands bonded at their interstices and is formed of a material which is substantially inert to urine. The screen is capable of withstanding the clawing action of an animal such as a cat, thus protecting the sorbent pad and the moisture impermeable liner. The holes in the screen are sized small enough to prevent the animal's claws from reaching the sorbent pad, while numerous and large enough to allow for air passage and rapid evaporation of liquids. The sheet layer of moisture impermeable material has length and width dimensions at least equal to that of the screen. The sorbent pad, constructed from high wicking capability materials, is positioned between the screen and the moisture impermeable material. The screen is sealed to the moisture impermeable material along at least a substantial portion of its peripheral edges, preventing movement of the sorbent pad.

The formation of the odor associated with cat litter boxes is prevented by inhibiting the bacterial action on cat urine. The cat urine is transferred directly from overlying litter particles, through the cat claw resistant screen into the high surface area and high urine sorbency sorbtive-desiccant member of fibers. The urine disperses quickly from fiber to fiber in the sorbtive-desiccant member. The moisture impermeable sheet prevents urine from leaving the sorbtive-desiccant member, preventing the entrapment of urine in areas where it is not exposed to air. The screen and the fibers of the sorbtive-desiccant member provide for aeration, thus inhibiting the growth and bacterial action of bacteria as well as the evaporation of the urine from the sorbtive-desiccant member. Consequently, the bacteria die or become dormant thereby preventing significant odor formation.

Cat urine is normally sterile, that is, free of bacteria which acts on the urine and produces the odor associated with cat urine. It has been found that if steps are taken to inhibit the growth of, or cause the death of bacteria, odor formation can be prevented. It is presumed that when the bacteria present in the fecal excreta, litter or air borne bacteria comes into contact with the urine, it produces an odor problem.

In accordance with the present invention steps are taken to prevent odor by killing the bacteria or inhibiting their growth, without having to resort to the use of bactericides.

Of all the various factors that influence the growth of microorganisms, water may be considered to be the most important. Indeed, water may really be considered a nutrient since it forms the bulk of the cellular substance. Compared to higher organisms, which regulate their water content to some extent, microorganisms are dependent upon the amount of water in the environment. For growth and multiplication bacteria require high concentrations of water in their immediate environment. In spite of their seemingly solid character and dry appearance, agar media and other solid foods used for the cultivation of bacteria require high concentrations of water as part of their composition. When organisms are grown on surfaces such as an agar plate, high humidity can provide conditions favorable to the development of microorganisms. Water acts as a solvent, and most metabolic activities are conducted within an aqueous environment in the cell. Water also serves as a catalyst by aiding or actually entering into many enzymatic reactions. Turgidity of the cell is dependent upon the presence of water. In turn, turgidity is affected by the surface tension (osmotic tension) of the medium in which the organisms are suspended. It probably would be correct to consider all bacteria as aquatic organisms.

Water is necessary for the existence and viability of micro organisms. The effects of desiccation on the viability of micro organisms provides a good example of the importance of water. Slow desiccation in the presence of air is most detrimental. Although many species of microorganisms can survive complete drying or desiccation for long periods, they do not grow under such conditions. In a state of complete desiccation the metabolic processes must stop almost completely since these depend largely on osmosis, diffusion, ionization and the colloidal state, all of which are dependent in turn on hydration.

Many of the commonly encountered microorganisms, when placed in an environment containing a high concentration of solute, fail to initiate growth. In a hypertonic solution, the cell loses water and shrinks (plasmolysis). In a hypotonic solution, there may be swelling (plasmoptysis) and the cell may actually burst if its integrity is not maintained by the rigid cell wall. In addition to the effects of plasmolysis and plasmoptysis, the osmotic tension of the medium may affect the permeability of the cell by its effect on membrane permeability.

Sodium chloride is widely used as a preservative commonly employed in conjunction with drying but may be added to food as a brine or may be pumped into the tissues. High concentrations of sodium chloride produce a high osmotic pressure and cause water to leave microorganisms causing plasmolysis. In general, putrefactive growth will be controlled with salt concentrations over 57%. Similar results can be obtained through the use of other osmotic producing substances which tie up water, making it unavailable for the growth of organisms. Sugar, because of its osmotic pressure in solution, prevents the growth and replication of most species of bacteria. Various harmless and odorless acids, such as lactic, citric, benzoic and sorbic, also produce the osmotic effect.

Extreme acidity or alkalinity can also effectively limit the growth of microorganisms, pH 4.5 to 9 being a limiting range of growth for many may organisms. Also, the activity of antimicrobial agents may be profoundly influenced by relatively small changes in the pH of the medium.

SCREEN MATERIALS

A flexible, screen like mesh or permeable or semipermeable membrane is utilized to prevent the animal from clawing through to the sorbent layer. The screen material must, therefore, exhibit sufficient strength to with stand the clawing action of the animal. Even though the screen is disposable, it is critical that the screen be made of a material which is relatively inert to urine thereby preventing rapid corrosion of the screen material, resultant odors and chemical activity. Some of the preferred materials of construction include polyester, nylon polypropylene, etc. Particularly in the case of hydrophobic materials, a surfactant must be used to prevent the screen from acting as a liquid transfer barrier. While the particular surfactant which is used is not narrowly critical, by way of illustration the surfactant can be a non-ionic surfactant such as Tergitol. The mesh-like screen or netting 19 can be formed by the spun bonding process as well known in the art. While it would appear that screens formed by this process would not be capable of providing the required claw rip resistance without resorting to such a high material density that moisture transfer would be either precluded or severely restricted and cost would be excessive, it has been found that a critical balance of properties can be achieved. At the lower limit, the hole size is so large that the protective ability becomes inadequate. The bottom plastic liner must be protected from the cat's claws since even tears can cause urine to seep under the liner causing a severe odor problem. Similarly the absorptive layer must be protected from the tearing action of the claws. For example, the screen of Vander Wall, U.S. Pat. No. 3,476,083, would be totally inoperative to prevent tearing of the absorptive layer or the plastic moisture barrier.

The use of loose screen-like screen is unacceptable because the mesh can be varied as a result of the force of the animal's claws. Accordingly, the reference to mesh size is intended to indicate the effective size under actual use conditions rather than a temporary size which can be readily altered by the animal.

Even though the screen is disposable, it is critical that the screen be made of a material which is relatively inert to urine thereby preventing rapid corrosion of the screen material, resultant odors and chemical activity.

Nonwovens, as applicable to the instant application, must meet specific standards in the following areas: abrasion resistance, air permeability, burst strength, tear strength, repellency, and chemical and environmental resistance. The screen used in the instant invention requires a high abrasion resistance to keep the screen from pilling or wearing thin in certain sections. The criteria of the bursting strength and tear strength are important to prevent ripping. The pressure exerted by an animal, especially by a cat, can put stress on the fabric in diagonal, horizontal and vertical directions simultaneously. If the protective screen is torn, the animal has access to the urine filled sorbent layer. The sorbent layer must be allowed to dry out and the bacteria should be aerated to the maximum extent. Thus, the air permeability of the screen is critical as air is required to prevent the accumulation of liquid urine and its odor, through evaporation and the maintenance of an aerobic environment. The liquid repellency of the screen allows all the urine to pass through the screen onto the sorbent layer and prevents the urine from being absorbed into the screen. The chemical and bacteria, etc. repellency of the screen prevents the corrosion of the screen by the urine as well as bacteria buildup within the fabrics.

The process used to form the nonwoven can be any of the known processes, such as dry formed, wet formed, melt blown, thermal bonded, etc. however the spunbonded and spunlaced tend to come closest to meeting the criteria of the instant invention. Detailed information is disclosed in a co-pending application.

The density of the screen must not be such that liquid and air passage is excessively restricted since it is these qualities which are critical to the operation of the invention.

A further benefit derived from the use of a nonwoven screen is the wicking action of the long strands of the screen. The wicking action serves to transfer urine from the sorbent pad 24 to the atmosphere by conveying the liquid out from under the litter and up the sides of the sorbent unit 12.

The efficacy of the wicking action of the screen is greatest in combination with a non-absorbent litter since the absorbent litters tend to retain the liquid and counteract the effect of the sorbent unit. The following chart illustrates the evaporation effect of the sorbent unit when used alone and in combination with a standard absorbent clay litter. In this case the screen was treated with a surfactant sold under the trademark Triton X-100. The sorbent unit was placed in a litter container with the absorbent section overlying the bottom of the container and the screen region extending up the sides of the container. The test was conducted at 73 degrees F. and 74% relative humidity. In the test, 300 ml. of water was added to the test unit and the net weight change was periodically measured.

It should be noted that the + changes indicate a weight increase undoubtedly due to the clay being hygroscopic and absorbing moisture from the atmosphere.

|  | TIME in hours | | | | | | |
|---|---|---|---|---|---|---|---|
|  | 2 | 4 | 7 | 10 | 13 | 22 | 24 |
| 2 IN. | +3.2 | +4.5 | +5.0 | +5.7 | +6.9 | +10.4 | +11.1 |
| 2" + L | +3.4 | +5.0 | +6.5 | +7.1 | +8.2 | +10.4 | +11.2 |
| 1" + L | +1.9 | 0 | −1.8 | −6.6 | −5.9 | −15.9 | −18.9 |
| 0.5" + L | −1.9 | −5.1 | −14.6 | −23.1 | −27.9 | −40.8 | −44.7 |
| 0.25" + L | −3.7 | −8.1 | −18.0 | −28.9 | −35.0 | −49.6 | −52.7 |
| LINER | −19.2 | −35.7 | −80.6 | −127.6 | −152.8 | −214.3 | −229.3 |
| WATER | −1.0 | −1.7 | −2.6 | −3.8 | −5.9 | −8.1 | −8.5 |

The wicking of the water up the sides of the screen to the top of the litter container was visually evident.

It is readily apparent from the foregoing that the use of two inches of an absorbent litter can actually retard the moisture evaporation, apparently due to the litter serving as a moisture barrier between the sorbent unit and the atmosphere. In actual use it has been found that the clawing and scratching of the cats tends to expose regions of the screen or at least greatly reduce the amount of litter covering certain regions of the screen. Although the ideal system would be free of litter the cats tend to reject a litter container which is totally litter free. The use of a non-absorbent litter which does not pack, or conversely, which permits the sorbent unit to "breath" minimizes the adverse effects of standard litters.

GRANULAR MATERIAL

The granular material as employed in the instant invention is utilized to satisfy the digging instinct of the animal and therefore, preferably, does not provide absorptive qualities. Consequently, inexpensive materials, such as clay, or non-absorbents can be used in accordance with individual preferences. unlike the commonly employed systems in which the granular material must be used in quantity to provide the required absorptive qualities and digging qualities, minimal quantities of the granular material should be used, as described herein. The absorption quality of the layer 24 preferably provides the total or the predominant desiccation effect.

The litter material is commonly in granular form and must be in moisture transfer contact with the underlying sorbent material so that the urine can be drawn from the litter material into the sorptive layers. The use of a surfactant on the screen material can enhance the moisture transfer capability of the screen and is essential in combination with hydrophobic or low hydrophilicity materials. The particle size distribution can range between 5.6 to 1 mm, corresponding to U.S. Series Standard Sieve opening #3 ½ to #18.

ABSORBENT UNIT

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of sorbent materials are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super absorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 28 grams per gram of laminate.

Alternatively, the super sorbent can be a material such as the National Starch and Chemical Corporation product sold under the registered trademark PERMASORB. The National Starch product is a hydrophilic polymer which has the ability to absorb and hold urine. There is a significant reduction in urine odor and pH level in the presence of PERMASORB.

Another example of an absorbent is the material sold under the trademark WATER-LOCK by Grain Processing Corp.

In contrast to the ultra-high absorbency materials, ground paper pulp absorptive material has been found to provide a combination of high absorbency, high surface area and low cost. The large surface area provides for rapid urine evaporation and consequently is extremely effective in odor prevention.

Through bacteriocidal chemicals or biologically active ingredients can be utilized within the liner, they are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an sorbent pad to effectively control odor development. It has been found that if the sorbent material has the ability to absorb the urine, distribute the urine rapidly throughout its mass, and evaporate the urine faster than the bacteria can act on the urine, then the additives are not only unnecessary but undesirable.

Bacteria from the feces cannot grow in the absorptive layer because they are dried out and die or become dormant. It is the bacteria which is capable of breaking down the urine which cause the strong volatile odor commonly associated with cat litter boxes, the dry environment of the sorbent material effectively prevents odor. The high absorption capacity of the super absorbent polymers, such as available from Dow Chemical, do not provide an advantage over a pulp fiber, due to the high rate of evaporation of urine from the fiberous material As previously stated, the instant invention requires substantially less granular material for each use and requires fewer changes, saving further on granular use. In the prior art type of litter box, the litter consumption is greater than in accordance with the present invention.

| GRANULAR MATERIAL CONSUMPTION (POUNDS PER MONTH) | | |
|---|---|---|
| | Ordinary Litter Box | System of the Invention |
| 1 cat | 40 | 2 to 4 |
| 2 cats | 60 | 2 to 6 |
| 3-5 cats | 80 to 100 | 20 |

| TIME PERIOD FOR CHANGING THE LITTER GRANULES (Number of changes per month) | | |
|---|---|---|
| | Ordinary litter box | System of the Invention |
| 1 cat | 15 | 1 to 2 |
| 2 cats | 15 to 18 | 1 to 2 |
| 3-5 cats | 30 | 4 |

The amount of litter which is used can be decreased with time in order to permit the cat to become accustomed to the low litter level. In some cases, cats can be trained to use the pads without litter. Whereas, in conventional litter boxes, at least two to three inches of litter are required, in accordance with the present invention less than one inch of litter should be used, and preferably no more than about one half inch, provides the desired results, as evident from the following chart.

The chart of FIG. 3 illustrates the evaporation effect of the sorbent unit when used alone and in combination with a standard absorbent clay litter. In this case the screen was treated with a surfactant sold under the trademark Triton X-100. The sorbent unit was placed in a litter container with the absorbent section overlying the bottom of the container and the screen region extending up the sides of the container.

It should be noted that the + changes indicate a weight increase undoubtedly due to the clay being hydroscopic and absorbing moisture from the atmosphere.

The wicking of the water up the sides of the screen to the top of the litter container is visually evident.

It is readily apparent from FIG. 3 that the use of two inches of an absorbent litter can actually retard the moisture evaporation, apparently due to the litter serving as a moisture barrier between the sorbent unit and the atmosphere. In actual use it has been found that the clawing and scratching of the cats tends to expose regions of the screen or at least greatly reduce the amount of litter covering certain regions of the screen. Although the ideal system would be free of litter the cats tend to reject a litter container which is totally litter free. The use of a non-absorbent litter which does not pack, or conversely, which permits the sorbent unit to "breathe" minimizes the adverse effects of standard litters FIG. 1 illustrates the assembled unit 10 of the instant invention. The granular material 20 is placed on top of the sorbent unit 12 to provide the animal with the necessary scratching materials, if so required. The granular material would not be required if the unit was being used for a dog or other animal which did not have the scratching instinct.

The sorbent unit can be used with standard litter boxes and can be combined with the adhesive securing means, elasticised securing means or any other method disclosed in copending applications.

Figure 2:
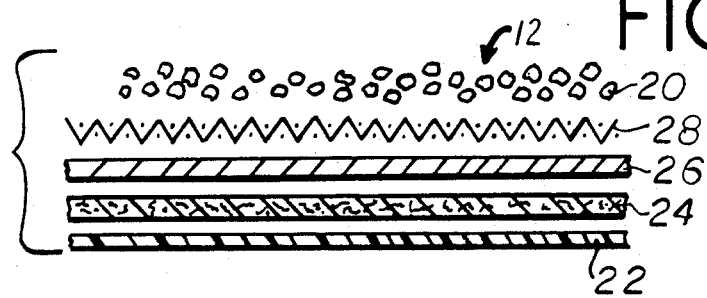
FIG. 2 is an exploded fragmentary view of the sorbent pad of the instant invention.

FIG. 2 shows, in exploded form, a cross-section of the layers which form the sorbent unit 12. The outer layer 22 which is a thin plastic sheet of a material such as polypropylene or polyethylene prevents waste from making contact with the box and can double as a bag when disposing of the soiled litter.

A protective layer 26, which can be used, if desired, is made from a durable, non-woven tissue substance. If a binder is used for either the fabric of the tissue layer or other layer, it must be of a non-water soluble material. The protective screen 28 is of a flexible, durable substance which prevents the animal from scratching through to the bottom layers. The granular material 20 is placed on top of the sorbent unit as previously described herein.

Urine evaporation tests were conducted for the purpose of comparing the evaporation rates of a variety of materials. In one instance the quantity of water was contained in a bowl having an eight inch diameter. In all instances 9 milliliters of liquid were tested since this represents the average amount of urine deposited on a litter pad by a cat each time it uses a pad. Quite obviously a young kitten will pass less liquid than a large adult cat. The following table shows the evaporation rate of the liquid from the Dow material, conventional cat litter and a wood pulp fiber absorbent pad. Statistically it has been determined that cats will void once every four hours and the quantity of liquid will be about 9-12 milliliters. In the event that the rate of evaporation of the urine is slower than the rate of deposit of urine in the pad, the pad will never reach a dry state and the odor associated with bacterial action on urine can not be prevented. It should be noted that a four hour time limit is beyond the maximum time permitted for the evaporation of the major portion of the urine, particularly if the litter box is used by more than one cat. It has been found that if the urine is not evaporated within a short period of time that the bacteria have sufficient time to attack the urine and begin the odor problem. Quite obviously this time factor will tend to be shorter on a warm day than on a cold day, due to the temperature dependency of the bacterial action. However, the higher temperature increases the evaporation rate of water thus offsetting the increased bacterial activity. It should also be noted that the evaporation process itself appears to maintain the bacteria in an inactive state.

| TOTAL QUANTITY OF WATER EVAPORATED (9.9 GRAMS = 10 ML) | | | | | |
| --- | --- | --- | --- | --- | --- |
| | A | B | C | D | E |
| 1 Hour | 3.2 | 2.9 | 2.5 | .5 | .4 |
| 2 Hours | 6.3 | 5.5 | 4.7 | .8 | .6 |
| 4 Hours | 9.6 | 8.0 | 7.2 | .9 | .7 |
| 6 Hours | 9.9 | 8.3 | 9.4 | 1.0 | .8 |
| Weight of water retained | | | | | |
| | A | B | C | D | E |
| 1 Hour | 6.8 | 7.1 | 7.5 | 9.5 | 9.6 |
| 2 Hours | 3.7 | 4.5 | 5.3 | 9.2 | 9.4 |
| 4 Hours | 0.4 | 2.0 | 2.8 | 9.1 | 9.3 |
| 6 Hours | 0.1 | 1.7 | 0.6 | 9.0 | 9.2 |

ABSORBENT

A = a high loft wood pulp (weight/cubic inches = , 17 by 23 inches)
B = a low loft wood pulp (weight/cubic inches = , 17 by 23 inches)
C = Dow laminate absorbent (weight/cubic inches = , 6 inches by 17 inches)
D = 8 inch diameter bowl
E = Kitty Litter brand of cat litter Ten milliliters (ml) of water was added to each of four cat litter liners at 1, 2 4 & 6 hours. This was also added to an open dish 8" diameter and to cat litter in a cup filed to a depth of one inch (230 grams). The cat litter was a product sold by the Lowes company under the name "Kitty Litter". All liners were laying on a flat surface having no litter on them. It should be understood that the addition of water is achieved by pouring from a container to one location. This is intended to simulate actual use conditions in contradistinction to the distributing of the water uniformly over the surface of the absorbent material.

Ordinarily, in cat boxes, the greater the quantity of litter the less is the odor. This is based on the requirement for a great deal of mass to absorb and retain the urine and still maintain a dry environment. By way of contrast, in the system of the present invention the use of less litter is best since the system relies on evaporation to achieve a long term dry environment and conventional litters tend to retard the loss of moisture. The drier the environment the less favorable are the conditions for the growth of bacteria. Where an inert, non-absorbent litter is employed, the quantity used can be somewhat greater than that which is used in the case of an absorbent litter.

It is seen from the comparison of samples A and B in the foregoing table that the greater the wicking action of the pad and consequently the greater the effective surface area and the greater the amount of urine exposed to the atmosphere, the greater will be the evaporation rate. Consequently, the greater will be the efficacy of the pad. The loft or density of the absorbent material is seen to have an effect on the evaporation rate since a relatively high loft fibrous mass provides for better aeration and evaporation. Whereas a low loft (highly compacted) absorbent tends to restrict the essential air flow, the greatest benefit is attained with a high loft material. The superabsorbents, of course, are extreme examples of a highly compacted absorbent which has much less surface area per ounce than the high loft fiberous absorbent.

It is noted that in sorbent pads, such as those used as disposable diapers for children or as incontinence pads for adults, evaporation is not a factor of concern since the pad traps the urine and holds it between a moisture impermeable liner and body of the user. The factors which are critical in human applications are liquid absorption and wicking effects only.

Evaporation rate maximization can be achieved, in part, if the urine travel within the pad is maximized; that is the wicking effect of the sorbent medium should be such that the urine distributes rapidly across the surface of the pad 24 thus maximizing the surface area of the urine exposed to the atmosphere In this regard it is noted that short fibers will have a larger surface area than long fibers, but long fibers optimize the wicking effect of the sorbent pad.

Additional maximization of evaporation can be obtained by the use of densified areas within the sorbent unit. By creating condensed and relatively sparse areas the wicking effect is magnified. The condensed sections of the sorbent unit 12 allow for the faster wicking due to the greater number of fibers within an area. Care must be taken, however, that the fibers are not densified to a point where no wicking effect is allowed. The sparser areas allow for greater air permeability and therefore greater evaporation. During use, the urine will be concentrated in one area. The use of densified areas permits the urine to rapidly travel from one sparse to the next until all the urine is sorbed into the rapid evaporation areas thereby preventing extreme uneven in wetness. The densifying of areas of sorbent materials is known in the art, however the purposes of the technique in the prior art are opposite that of the instant invention. Prior art patents encourage storage of the liquids while the instant disclosure is aimed at the evaporation of the liquids. Typical or standard ambient conditions means a temperature of 70° and 50% relative humidity. Under these conditions the rate of urine evaporation in a plain pad is preferably at least 200–250 ml in a twenty four hour period. Liners with one half inch to about one inch of litter will evaporate about 60–80 ml. in twenty four hours. A non-absorbent litter can evaporate the same quantity of urine as a pad.

The combination as a whole allows the evaporation process to work. If the screen did not protect the sorbent layer from being torn, the sorbent layer would be torn creating areas with tightly packed material and others with no sorptive material. The thickness and sizing of the sorbent layer allows the urine to spread and evaporate. An extremely dense layer, such as might be desirable for a diaper for a toddler, would prevent evaporation. A very thin layer, such as a panty liner, would not allow sufficient urine to be sorbed and would not have the loft required for the evaporation process.

One of the major drawbacks of the conventional litter used in cat litter boxes is that the litter tends to retain the urine and retard urine evaporation. Similarly, the so called 'super sorbent' materials, such as Dow Water Absorbent Laminate grade DWAL35R sold by Dow under the trademark DWAL, have an extremely high ratio of liquid sorbents to material mass, causing the material to retain urine or other liquids and stay wet for a long period of time. By way of contrast, sorbent materials from wood pulp fibers do not have the high absorbency capacity of the Dow material, but have a greater ability to distribute the urine across the pad and achieve the evaporation of the urine. Since urine evaporation has been determined to be the key factor in odor prevention, the use of a large amount of cat litter should be avoided. While the use of no litter at all would be optimum from the standpoint of odor prevention, it is difficult to train animals to use a pad that does not have litter present. More over, the litter does have a beneficial effect in combination with solid wastes and cats will tend to not use the litter box which does not have litter when defecating. Thus, while the use of two or preferably three inches of litter is commonly recommended for litter boxes, it has now been found that the use of less than one inch and preferably from about one quarter inch to about one half inch of litter produces the optimum combination of solid waste handling characteristics, economy of material and minimum urine evaporation prevention.

What is claimed is:

1. The method of preventing the formation of the odor associated with cat urine by preventing bacterial action on the urine, comprising the steps of
    a providing cat urine transfer directly to a sorbtive-desiccant member,
    b sorbing said urine in a high surface area, high urine sorbency sorbtive-desiccant member having a high wicking capacity,
    c aerating said sorbtive-desiccant member to inhibit the growth and bacterial action of anaerobic bacteria,
    d rapidly dispersing urine across said sorbtive-desiccant member by the wicking action of said member thereby maximizing the surface area of the urine and causing the urine to evaporate from said high surface area sorbtive-desiccant member at a rate which causes bacteria in said sorbtive-desiccant member to die or become dormant thereby preventing significant odor formation.

2. The method of claim 1 wherein the wicking action and the effective surface area of the sorbtive-desiccant member provide an exposure to the atmosphere such that in a twenty four hour period the evaporation rate of the urine is at least about equal to the average rate of a cat's application of urine to said sorbtive-desiccant member.

3. The method claim 1 further comprising non-absorbent granules in liquid transfer contact with said sorbtive-desiccant member.

4. The method of claim 1, wherein the sorbtive-desiccant member is a low density, high loft fibrous mass thus providing high aeration to achieve an evaporation rate such that in a twenty four hour period the urine evaporation rate is greater than the average rate of a cat's application of urine to said sorbtive-desiccant member.

5. The method of claim 1, wherein the sorbtive-desiccant member has a sufficiently low density and sufficiently high loft fibrous mass to provide high aeration and to achieve an evaporation rate such that in a four hour period said sorbtive-desiccant member will evaporate at least about 80% of 10 milliliters of applied water, at standard ambient conditions.

6. The method of claim 1, wherein the sorbtive-desiccant member has a sufficiently low density and sufficiently high loft fibrous mass to provide high aeration and to achieve an evaporation rate such that in a six hour period said sorbtive-desiccant member will evaporate at least about 90% of 10 milliliters of applied water, at standard ambient conditions.

7. The method of claim 1, wherein the rate of evaporation of urine from said sorbtive-desiccant over a four hour period is at least about equal to the rate of deposition of urine by a cat on said sorbtive-desiccant in said four hour period, whereby said sorbtive-desiccant is essentially too dry for bacteria to be able to act on the urine sorbed in said sorbtive-desiccant member and to produce undesired odors.

8. The method of claim 1, wherein said sorbtive-desiccant member is formed of fibers having a high surface area and high urine sorbency, whereby said urine is transferred rapidly from fiber to fiber in said sorbtive-desiccant member causing said urine to have a high exposure to air and a high evaporation rate.

9. The method of preventing the formation of the odor associated with cat litter boxes by preventing bacterial action on cat urine, comprising the steps of
  a providing cat urine transfer directly from overlying litter particles through a cat claw resistant screen means into a sorbtive-desiccant member by
  b sorbing said urine in a high surface area, high urine sorbency sorbtive-desiccant member having a high wicking capacity;
  c preventing urine from leaving the surface of said sorbtive-desiccant member opposite said screen means by having said surface opposite said screen means in contact with moisture impermeable means, said screen means and said moisture impermeable means being relatively immovable with respect to each other, said screen means being of:
    sufficient tear strength and sufficiently small hole size to protect said sorbtive-desiccant member and said moisture permeable member from the clawing action of a cat,
    sufficiently high moisture and air permeability to provide for aeration of said sorbtive-desiccant member,
    sufficient hydrophilicity such that urine can pass through the screen means and without bead formation on the surface of the screen,
  d aerating said sorbtive-desiccant member to inhibit the growth and bacterial action of anaerobic bacteria,
  e rapidly dispersing urine across said sorbtive-desiccant member thereby maximizing the surface area of the urine and causing the urine to evaporate from said high surface area sorbtive-desiccant member through said screen means at a rate which causes bacteria in said sorbtive-desiccant member to die or become dormant thereby preventing significant odor formation.

10. The method of claim 9, wherein the rate of evaporation of urine from said sorbtive-desiccant over a four hour period is at least equal to the rate of deposition of urine on said sorbtive-desiccant in said four hour period, whereby said sorbtive-desiccant is essentially dry before bacteria can act on the urine sorbed in said sorbtive-desiccant member to significantly produce undesired odors.

11. The method of claim 10 wherein said litter particles are substantially nonabsorbent.

12. The method of claim 9, wherein the wicking capacity and the effective surface area of the sorbtive-desiccant member provide an exposure to the atmosphere such that in a twenty four hour period the evaporation rate of the urine is at least about equal to the average rate of a cat's application of urine to said sorbtive-desiccant member.

13. The method of claim 9, wherein the sorbtive-desiccant member is a low density, high loft fibrous mass thus providing high aeration to achieve an evaporation rate such that in a twenty four hour period the urine evaporation rate is greater than the average rate of a cat's application urine to said sorbtive-desiccant member.

14. The method of claim 9, wherein the sorbtive-desiccant member has a sufficiently low density and sufficiently high loft fibrous mass to provide high aeration and to achieve an evaporation rate such that in a four hour period said sorbtive-desiccant member will evaporate at least about 80% of 10 milliliters of applied water, at standard ambient conditions.

15. The method of claim 9, wherein the sorbtive-desiccant member has a sufficiently low density and sufficiently high loft fibrous mass to provide high aeration and to achieve an evaporation rate such that in a six hour period said sorbtive-desiccant member will evaporate at least about 90% of 10 milliliters of applied water, at standard ambient conditions.

16. The method of claim 9, wherein the rate of evaporation of urine from said sorbtive-desiccant over a four hour period is at least equal to the rate of deposition of urine on said sorbtive-desiccant in said four hour period, whereby said sorbtive-desiccant is essentially dry before bacteria can act on the urine sorbed in said sorbtive-desiccant member to produce undesired odors.

17. The method of claim 9, wherein said sorbtive-desiccant member is formed of fibers having a high surface area and high urine sorbency, whereby said urine is transferred rapidly from fiber to fiber in said sorbtive-desiccant member causing said urine to have a high exposure to air and a high evaporation rate.

18. The method of preventing the odor caused by the action of bacteria on cat urine in a cat litter box having a base and walls, sorbtive-desiccant pad member laminate means for the collection of animal urine overylying said base and granular particles on said pad member laminate means, said sorbent pad member laminate means including
  A a bottom sheet layer of moisture impermeable material,
  B an intermediate sorbtive-desiccant member formed of material having high surface area with a high wicking capacity and high sorption capacity for urine, and
  C a top protective screen means on the side of said intermediate sorbent layer opposite said bottom sheet layer of moisture impermeable material, said protective screen means being of sufficient tear strength and sufficiently small hole size to protect said sorbtive-desiccant member from the pawing action of a cat and said moisture impermeable material and sufficient cat urine transfer capability such that urine transfer rapidly from said granular particles through said screen means to said sorbtive-desiccant member, comprising the steps of:
    a transferring cat urine directly from said granular particles, through said protective screen means to said sorbtive-desiccant member by,
    b sorbing said urine in said sorbtive-desiccant member and dispersing the urine quickly in said sorbtive-desiccant member, c preventing urine from leaving a first surface of said sorbtive-desiccant member by having said first surface of said sorbtive-desiccant member in contact with said sheet layer of moisture impermeable material, d maintaining the urine in a medium which subjects bacteria in the urine to osmotic shock, e evaporating said urine from a second surface of said high surface area sorbtive-desiccant member through said screen means and causing bacteria, which are capable of breaking down cat urine, to die or become dormant thereby preventing significant odor formation.

19. The method of claim 18, wherein said protective screen means is formed of flexible strands and has sufficient cat urine permeability such that in use urine passes through said screen without the formation of beads of urine on the surface of the screen.

20. The method of claim 18 wherein said litter particles are substantially non-absorbent.

21. The method of claim 18, wherein the wicking capacity of the sorbent-desiccant pad member laminate means and the effective surface area of the sorbtive-desiccant pad member laminate means provides an exposure to the atmosphere such that in a twenty four hour period the evaporation rate of the urine is at least about equal to the average rate of a cat's application of urine to said sorbent-desiccant pad member laminate means.

22. The method of claim 18 wherein the sorbtive-desiccant member laminate means is a low density, high loft fibrous mass thus providing high aeration to achieve an evaporation rate such that in a twenty four hour period the urine evaporation rate is greater than the average rate of a cat's application of urine to the pad member laminate means.

23. The method of claim 18, wherein the sorbtive-desiccant paid member laminate means has a sufficiently low density and sufficiently high loft fibrous mass to provide high aeration and to achieve an evaporation rate such that in a four hour period said sorbtive-desiccant member will evaporate at least about 80% of 10 milliliters of applied water, at standard ambient conditions.

24. The method of claim 18 wherein said litter particles are substantially nonabsorbent.

25. The method of claim 18, wherein the sorbtive-desiccant member laminate means has a sufficiently low density and sufficiently high loft fibrous mass to provide high aeration and to achieve an evaporation rate such that in a six hour period said sorbtive-desiccant member laminate means will evaporate at least about 90% of 10 milliliters of applied water, at standard ambient conditions.

26. The method of claim 18, wherein the rate of evaporation of urine from said sorbtive-desiccant member laminate means over a four hour period is at least equal to the rate of deposition of urine on said sorbtive-desiccant member laminate means in said four hour period, whereby said sorbtive-desiccant member laminate means is essentially dry before bacteria can act on the urine sorbed in said sorbtive-desiccant member laminate means to significantly produce undesired odors.

* * * * *